W. B. BROOKS & J. BRASWELL.
Fastenings for Ropes.
No. 216,143. Patented June 3, 1879.
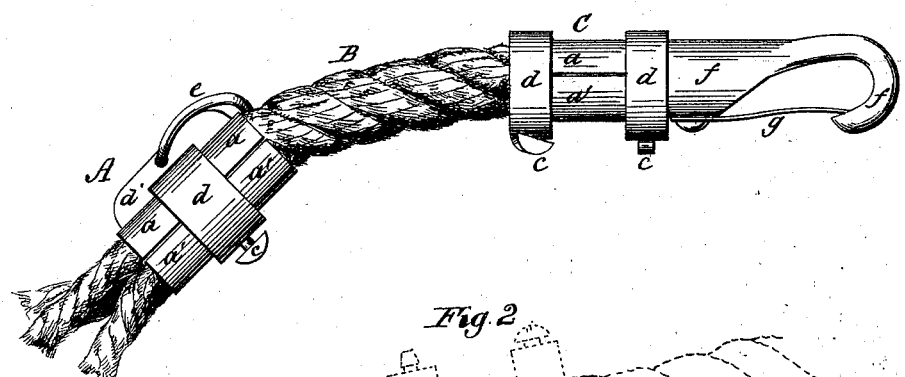
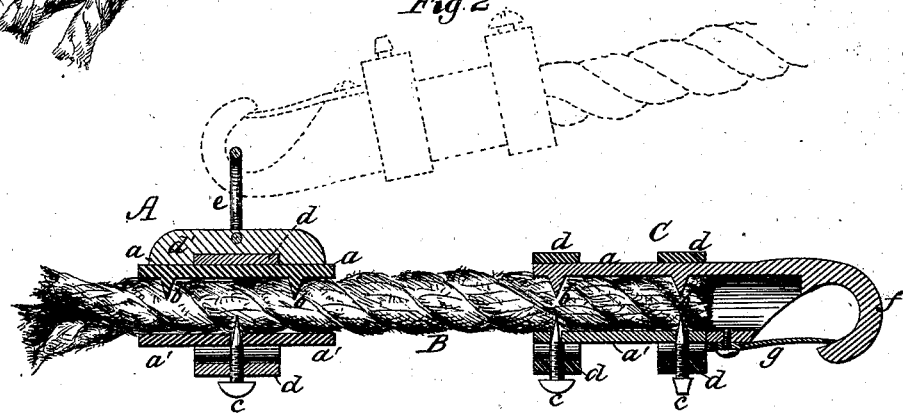
Witnesses:
Inventors:
William B. Brooks
Jacob Braswell

UNITED STATES PATENT OFFICE.

WILLIAM B. BROOKS AND JACOB BRASWELL, OF WARREN, ARKANSAS.

IMPROVEMENT IN FASTENINGS FOR ROPES.

Specification forming part of Letters Patent No. 216,143, dated June 3, 1879; application filed May 21, 1878.

*To all whom it may concern:*

Be it known that we, W. B. BROOKS and JACOB BRASWELL, of Warren, in the county of Bradley and State of Arkansas, have invented a new and Improved Fastening for Ropes; and we do hereby declare that the following is a full, clear, and exact description of the same.

Clamp and hook attachments for halter-ropes have been employed to facilitate securing such ropes to rings or other objects.

Our invention is an improvement in this class of devices, and is illustrated in accompanying drawings, in which—

Figure 1 is a plan view of a piece of rope with our invention attached thereto; and Fig. 2 represents the same parts similarly connected, but with the clamping devices in longitudinal section.

The invention is embodied in two clamping devices, one a clamp provided with a hook and adapted for application to the end of a rope, and the other clamp provided with a ring and adapted for application to any other portion of the rope.

The particular construction and arrangement of parts are as follows: The body of the ring-clamp A is formed of two longitudinal sections or halves, $a$ $a'$, of a short tube. One part, $a$, has internal teeth, $b$, and the other a hole to receive the conical point of a thumb-screw, $c$.

The two parts $a$ $a'$ of the clamp are held together by a circular band or sleeve, $d$, which is permanently attached to part $a$ by passing through a slot in its rib $d'$, and is detachably connected with the other part, $a'$, of the tube by the thumb-screw $c$, which screws through it at a point coincident with the aforesaid aperture in the part $a'$. A ring or loop, $e$, is permanently attached to the rib $d'$.

To apply this ring-clamp A to the rope B, the band $d$ is slipped over the end of the rope and passed along to the desired point, and the part $a'$ is then inserted between rope and band. The screw $c$ is then turned, thus causing its point to enter the hole in the part $a'$, and, said hole being smaller than the screw, the part $a'$ is pressed against the rope, and the part $a$ drawn toward it with like force. The spurs $b$ are thereby forced into the rope on one side, and the point of the screw enters it on the other, and the clamp is thus securely attached to the rope.

It is obvious that by removing the screw the clamp may be moved along the rope and secured at any other point with convenience and dispatch.

The body of the hook-clamp C is composed of the same parts as the ring-clamp A; but, as an additional means of securing it to the rope, we prefer to use two bands or sleeves, $d$.

The hook $f$ is formed on one end of the part $a$, and has a spring, $g$, attached, as shown.

The mode of applying the hook-clamp C is, obviously, the same as that of the ring-clamp A.

In attaching the halter-rope B to any fixed object it is passed around it, or through it, or through a ring attached to it, and the hook $f$ is snapped into the ring $e$ of the clamp A, as shown in dotted lines, Fig. 2. The attachment is thus quickly and securely made.

We do not claim a ring or hook clamp composed of two semi-cylindrical tubular parts. Nor do we claim the employment of a conical-pointed screw with a ring or analogous device to form a rope-clamp.

What we claim is—

1. The combination of the screw having a conical point with the band and the internal-toothed parts $a$ and $a'$, said part $a'$ having an aperture to receive the point of the screw, but which is of less diameter than the body of the latter, as shown and described, for the purpose specified.

2. The combination of the band $d$ and set-screw with the toothed part $a$, having rib $d'$, and the ring or loop $e$, screw $c$, and part $a'$, as shown and described.

WILLIAM B. BROOKS.
JACOB BRASWELL.

Witnesses:
W. W. HUGHEY,
A. A. ANDERSON.